(12) United States Patent
Grunwald

(10) Patent No.: US 9,009,963 B2
(45) Date of Patent: Apr. 21, 2015

(54) METHOD FOR JOINING STRUCTURAL ELEMENTS ONTO A SHAFT

(71) Applicant: Mahle International GmbH, Stuttgart (DE)

(72) Inventor: Lutz Grunwald, Wustermark (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 13/685,265

(22) Filed: Nov. 26, 2012

(65) Prior Publication Data

US 2013/0133474 A1    May 30, 2013

(30) Foreign Application Priority Data

Nov. 24, 2011    (DE) .......................... 10 2011 087 049

(51) Int. Cl.
| | |
|---|---|
| B21D 53/84 | (2006.01) |
| F16H 53/02 | (2006.01) |
| B32B 37/12 | (2006.01) |
| B32B 37/06 | (2006.01) |
| B23P 11/02 | (2006.01) |
| F01L 1/047 | (2006.01) |

(52) U.S. Cl.
CPC .............. *F16H 53/025* (2013.01); *B32B 37/12* (2013.01); *B32B 37/06* (2013.01); *B23P 11/02* (2013.01); *F01L 1/047* (2013.01); *B23P 11/025* (2013.01); *B23P 2700/02* (2013.01)

(58) Field of Classification Search
CPC .............................. F01L 1/047; B23P 2700/02
USPC ........... 29/888.1, 525, 523; 123/90.17, 90.48, 123/90.44, 90.6, 90.27; 474/152
See application file for complete search history.

(56) References Cited

U.S. PATENT DOCUMENTS

| | | | | |
|---|---|---|---|---|
| 4,616,389 | A * | 10/1986 | Slee .................................. 419/8 |
| 5,307,708 | A * | 5/1994 | Matt ................................. 74/567 |
| 5,887,557 | A * | 3/1999 | Battlogg .................... 123/90.17 |
| 7,290,515 | B2 * | 11/2007 | Schmid ........................ 123/90.6 |
| 7,721,432 | B2 * | 5/2010 | Burgler ......................... 29/888.1 |
| 8,109,246 | B2 * | 2/2012 | Gallon et al. .............. 123/90.48 |
| 2007/0234988 | A1 | 10/2007 | Kobus et al. |
| 2010/0058888 | A1 | 3/2010 | Mueller et al. |

FOREIGN PATENT DOCUMENTS

| | | |
|---|---|---|
| DE | 102006012358 A1 | 9/2007 |
| DE | 102007018920 B3 | 8/2008 |
| JP | 2002-257149 A | 9/2002 |

OTHER PUBLICATIONS

English abstract for JP-2002-257149.

* cited by examiner

*Primary Examiner* — Richard Chang
(74) *Attorney, Agent, or Firm* — Rader, Fishman & Grauer PLLC

(57) ABSTRACT

A method for joining structural elements onto a shaft may include generating at least one projection at a respective joining position on the shaft, sliding at least one of the structural elements over at least one projection and maintaining the structural elements in at least on projection.

20 Claims, 1 Drawing Sheet

METHOD FOR JOINING STRUCTURAL ELEMENTS ONTO A SHAFT

CROSS-REFERENCE TO RELATED APPLICATION

This application claims priority to German Patent Application 10 2011 087 049.0, filed on Nov. 24, 2011, which is hereby incorporated by reference in its entirety.

TECHNICAL FIELD

The present invention relates to a method for joining structural elements onto a shaft. The invention further relates to a camshaft having at least one cam and/or a sprocket wheel/belt pulley/control element joined thereon according to such a method.

BACKGROUND

In modern camshaft production, the cams are usually thermally joined onto the associated camshaft, for which reason they are first heated and subsequently shrink-fitted on the ground camshaft. The same applies also to joining sensor wheels, chain wheels, etc. To be able to join a component, for example, a cam reliably onto the associated shaft without damaging said shaft, this component has to be heated to such an extent that its bore is larger than the shaft. The disadvantage of thermal joining is the dwell time required for shrinking the component, during which time neither the component nor the shaft can be moved. In order to keep the dwell time and thus the cycle time as short as possible, the respective component is therefore expanded, that is, thermally heated, just wide enough that the component can be reliably joined. However, since in series production in some cases very different component dimensions and therefore very different tolerances are to be expected, reducing the dwell time is subject to a natural limit due to the existing component tolerances. Under test conditions, dwell times can be set close to zero; however, due to the tolerances, this would not allow a stable process under production conditions and is therefore not possible. Since component tolerances can be reduced only to a limited extent and, depending on the component, for example, in the case of hardened cams, can even get tighter, a significant reduction of the dwell time and thus a shortening of the cycle time is currently not possible or not possible without problems. Since the dwell time accounts for approx. 30% of the process time during joining, a significant reduction of the dwell time would result in considerable advantages in production.

SUMMARY

The present invention is therefore concerned with the problem of providing an improved method for joining structural elements onto a shaft, which method is in particular characterized by significantly reduced cycle times.

This problem is solved according to the invention by the subject matters of the independent claims. Advantageous embodiments are subject matter of the dependent claims.

For joining structural elements onto a shaft, for example, for joining cams onto a camshaft, the present invention is based on the general idea to initially generate at the respective joining position on the shaft, prior to the actual joining process, at least one projection of the kind of a material accumulation or a stamping-related material accumulation and to subsequently slide the structural element over said projection or material accumulation, wherein the structural element is then held and fixed by said projection, that is, by said material accumulation until the joining process, for example, cooling the structural element is completed. With the method according to the invention it is theoretically possible to achieve dwell times of zero since during the joining process, minimal material accumulations are generated, for example, with a stamping tool, on the shaft in the area of the respective press fit, that is, in the area of the respective joining position. Preparing the material accumulations or projections is always carried out, without affecting the cycle time, for the respective next structural element to be joined in the process flow. Due to its small size, the projection, i.e., the material accumulation has no immediate impact on the actual press fit since during shrink-fitting the structural element sitting on said projection, for example, the heated cam sitting on said projection, the latter is flattened again due to the surface pressure. The main advantage of said method here is that the structural element to be joined is already fixed immediately after positioning on the shaft, and as a result of this, the previous process-related dwell times can be eliminated. However, it is to be considered here that in the process flow, the projections or material accumulations can always be made only for the respective next structural element to be joined because otherwise, the structural element would flatten all upstream material accumulations during joining. This problem is solved as follows: The projections for the first press fit, that is, at the first joining position, are not made in a joining machine, but in an upstream station which makes it possible that the first structural element can be joined without delay. While the joining machine joins the first structural element, the projection(s) or the material accumulation for the next structural element is generated at the same time with a stamping tool that is arranged offset. Generating the projection or the material accumulation is preferably carried out with a pneumatically or electrically operated stamping hammer, but could also be carried out by means of a laser. Also, the last mentioned method could later specifically be used for increasing the transmissible torque of the joining connection. A mechanical stamping tool is made of polycrystalline diamond (PCD) or cubic boron nitride (CBN) (both are ultra-hard cutting materials) and has a defined radius of, for example, 0.5 mm so as to ensure good reproducibility and long-term stability of the stamping process. The height of the generated projection or the generated material accumulation is checked at regular intervals, for example, by means of a tactile or optical measuring method. In general, generating the material accumulation can be controlled through settings of a control pressure, a load or a spring preload of the stamping tool.

In an advantageous refinement of the method according to the invention, the structural elements are glued to the shaft. The method according to the invention comprising the generation of projections or material accumulations can be used not only for thermally joining the structural elements with the shaft, but also for gluing the structural elements to the shaft. When gluing the structural elements to the shaft, here too, the projections or material accumulations effect a secure fixation until the adhesive is cured and the structural element placed on said projections is firmly fixed on the shaft. With the method according to the invention it is therefore possible to achieve significant reductions of the dwell time not only when purely thermally joining structural elements, for example, cams onto camshafts, but theoretically also when gluing structural elements onto shafts, so that cycle times are shortened and the production process as a whole can be implemented in a more efficient manner.

In an advantageous refinement of the method according to the invention, for each structural element to be joined, in each case three projections or material accumulations are generated at the later joining position of the shaft, wherein said material accumulations are arranged offset relative to one another by in each case 120°. Three such projections or material accumulations ensure a uniform and statically determinate fixation of the structural element fixed thereon, wherein theoretically, just one projection is also sufficient, of course. When thermally joining, the projections are flattened when the structural element shrinks or when the shaft expands, if the latter has been cooled, and therefore have no influence on the properties of the later shaft.

Further important features and advantages of the invention arise from the sub-claims, from the drawings, and from the associated description of the figures based on the drawings.

It is to be understood that the above mentioned features and the features still to be explained hereinafter are not only usable in the respective mentioned combination but also in other combinations or alone without departing from the context of the present invention.

Preferred exemplary embodiments of the invention are illustrated in the drawings and are explained in the following description in more detail.

BRIEF DESCRIPTION OF THE DRAWINGS

In the figures, schematically:

FIG. 1b shows a camshaft onto which cams are joined according to the inventive method.

DETAILED DESCRIPTION

Figure 1A:
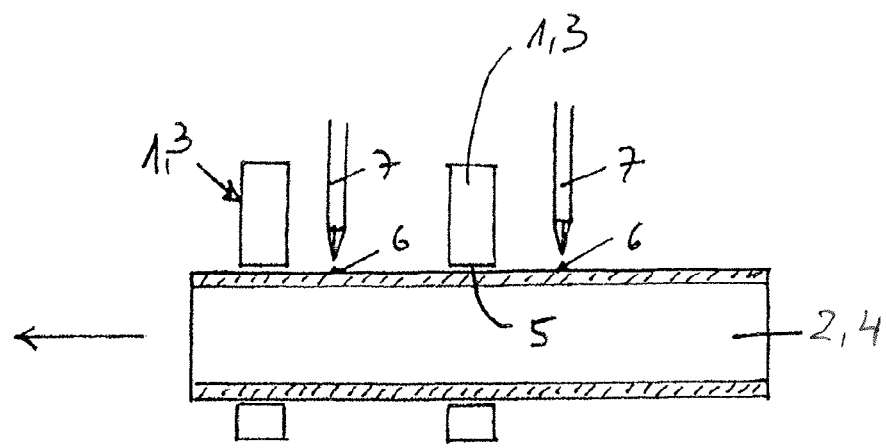
FIG. 1a shows a camshaft onto which projections are generated according to the method of the invention.
Figure 3:
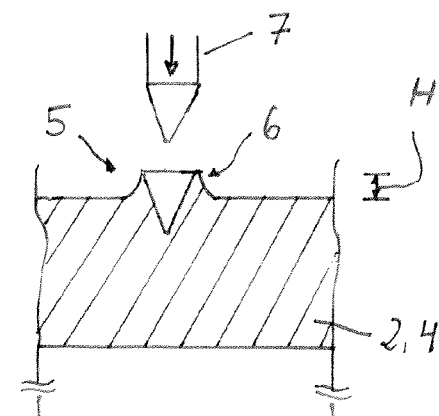
FIG. 3 shows a detailed view of a projection.

According to the FIGS. 1a and 1b, a method according to the invention for joining structural elements 1 onto a shaft 2, for example, for joining cams 3 onto a camshaft 4 is illustrated, wherein at a respective joining position 5, prior to the actual joining, at least one projection 6 of the kind of a material accumulation is prepared, for example, by means of a centre punch 7 or a laser (cf. FIG. 1a and FIG. 3), and wherein subsequently, the structural element 1/the cam 3 is slid over the at least one material accumulation or the at least one projection 6, and is held by latter until the joining process is completed (cf. FIG. 1b). Of course, the structural element 1 can also be designed as a chain wheel/belt pulley, gear wheel, pump cam, sensor wheel, rotor or other control element which is to be joined onto an associated shaft 2. Joining the structural elements 1 with the shaft 2 is usually carried out thermally, wherein the structural elements 1 are heated and/or the associated shaft 2 is cooled. Alternatively, gluing the structural elements 1 to the shaft 2 is also conceivable. By preparing the projections 6 prior to the actual joining, the dwell time which, for example, is required for cooling the structural elements 1 or the cams 3 so as to establish the press fit, can be reduced to almost zero so that the cycle time can be reduced, and the production as such can be streamlined.

The centre punch 7, for example, can be operated pneumatically or electrically, wherein, of course, a laser or a welding electrode can also be used for creating the projection 6. According to FIG. 3, a centre punch 7 is illustrated which has just created a projection 6 on an outer side of the shaft 2. The height H of the projection 6 is only a few μm and depends on the tolerances of the respective partners to be joined and the selected joint gap. The height H of the generated projections 6 is permanently checked, for example, by means of non-illustrated optical measuring devices so that reproducible joining can be achieved. Alternatively or additionally, there is the possibility of monitoring the stamping process by means of structure-borne sound measurement (not illustrated). The structure-borne sound generated when the centre punch 7 strikes against the shaft 2 is measured and allows a conclusion with regard to the correct generation of the projection 6. Of course, the generation itself of the projections 6 can be checked in the same manner, for example, by monitoring a control pressure or a spring preload of a stamping hammer on which the centre punch 7 is fastened.

The benefit of the described invention is that the structural element 1 to be joined is already fixed immediately after positioning on the shaft 2, and the previous process-related dwell times for cooling can be eliminated, resulting in a significant increase of efficiency of the joining process. The desired effect is achieved according to the invention in that prior to joining the structural element 1 onto the shaft 2, one or a plurality of material accumulations (projections 6) are generated in the area of the respective press fit 5. Due to their small size, these projections 6 have no immediate impact on the actual press fit because during shrink-fitting the structural element 1 sitting on said projections, the latter are flattened again due to the surface pressure.

If on the same shaft 2, a plurality of structural elements 1 is successively joined, it is to be considered that in the process flow, this projection 6 can always be generated only for the respective next structural element 1 to be joined because otherwise, the structural element 1 would flatten all upstream projections 6 during joining.

A closer look at FIG. 1 shows that preparing the projections 6 takes place immediately before the actual joining, wherein a joining tool usually comprises a plurality of centre punches 7 or suitable stamping tools or lasers. In case of the methods illustrated according to FIG. 1, the shaft 2 is slid in from the right to the left and the respective projections 6 are prepared immediately before joining with the structural elements 1 or the cams 3. The centre punch 7, for example, can have a tip diameter of approx. 0.5 mm.

The described projection 6 (material accumulation) is generated with a suitable method, e.g., a pneumatically or electrically operated stamping hammer, a scribing tool, a laser, a welding electrode or the like. A suitable method is characterized in that the desired projection 6 can be generated so as to be influenceable in terms of shape position and height, and in a long-term stable and reproducible manner.

Figure 2:
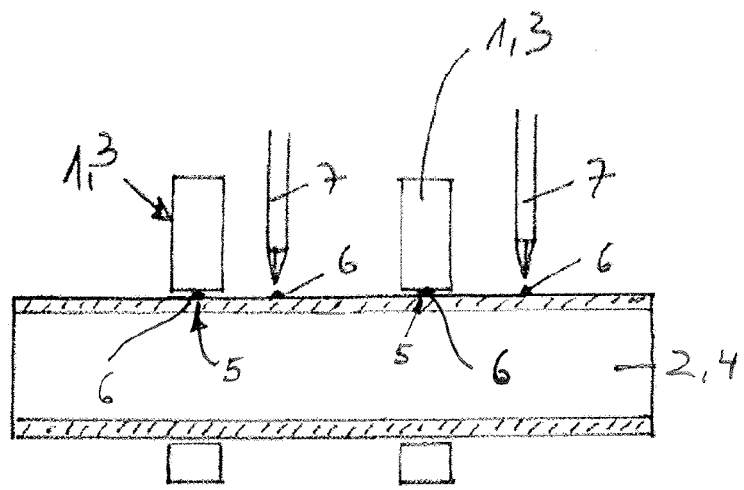
FIG. 2 shows a sectional view through a possible embodiment of the shaft/camshaft.
Figure 2:
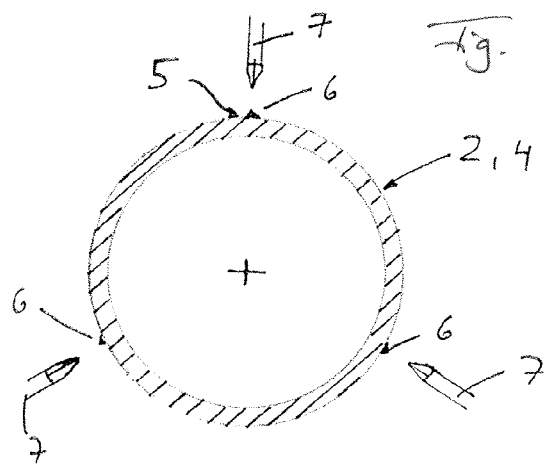

When viewing FIG. 2, it is apparent that on the shaft 2, in particular, on the camshaft 4, a total of three projections 6 are provided which are arranged on an outside of the shaft 2/camshaft 4 and which are in each case offset relative to one another by 120° circumferential angle. The main advantage of the method according to the invention is that the structural element 1 to be joined, that is, in particular, the cam 3 to be joined is already fixed by the projections 6 immediately after sliding it on the joining position 5, and as a result of this, the previous process-related dwell times, for example, for cooling the structural elements 1 or the cams 3 can be eliminated.

With the method according to the invention, the dwell time can be significantly reduced, preferably close to zero, which makes it possible to significantly shorten the joining process since up to now, the dwell time accounts for up to 30% of the process time.

The invention claimed is:

1. A method for joining structural elements onto a shaft, comprising: generating at least one projection at one or more radial locations on an outer side of the shaft at a first axial joining position on the shaft, then sliding one of the structural elements over the at least one projection at the first axial joining position, then joining the one of the structural elements to the shaft, and at the same time generating at least one projection at one or more radial locations on an outer side of the shaft at a second axial joining position on the shaft, then sliding another one of the structural elements over the at least one projection at the second axial joining position, and maintaining the structural elements on the respective projections.

2. The method according to claim 1, wherein the shaft includes a camshaft, and each of the structural elements includes at least one of a cam and a chain wheel belt.

3. The method according to claim 2, wherein the structural elements are thermally joined with the camshaft by at least one of heating the structural elements and cooling the camshaft.

4. The method according to claim 2, wherein the structural elements are glued to the camshaft.

5. The method according to claim 2, wherein the at least one projection is generated by at least one of a centre punch and by a laser and by a welding electrode.

6. The method according to claim 1, wherein the structural elements are thermally joined with the shaft by at least one of heating the structural elements and cooling the shaft.

7. The method according to claim 1, wherein the structural elements are glued to the shaft.

8. The method according to claim 1, wherein the at least one projection is generated by at least one of a centre punch and by a laser and by a welding electrode.

9. The method according to claim 1, wherein the at least one projection is generated immediately before joining the structural elements.

10. The method according to claim 1, wherein the generating of the at least one projection at one or more of the first axial joining position and the second axial joining position includes generating three projections, each being offset to one another by 120° at the respective axial joining position of the shaft.

11. The method according to claim 1, wherein the at least one projection is generated at least one of pneumatically and electrically.

12. The method according to claim 1, wherein the generating of the at least one projection includes using a centre punch having a tip diameter of approximately 0.5 mm.

13. A method for joining structural elements onto a shaft having an axis, the method comprising:
generating three projections at a same axial location along the shaft, the three projections being offset at approximately 120 degrees from each other, the three projections having a same height;
sliding one of the structural elements over the three projections; joining the one of the structural elements to the shaft; at the same time as joining the one of the structural elements to the shaft, generating at least one projection at one or more radial locations on an outer side of the shaft at another axial location along the shaft; and
maintaining the structural elements on the three projections.

14. The method according to claim 13, wherein the shaft includes a camshaft, and each of the structural elements includes at least one of a cam and a chain wheel belt.

15. The method according to claim 13, wherein the structural elements are thermally joined with the shaft by at least one of heating the structural elements and cooling the shaft.

16. The method according to claim 13, wherein the generating of the at least one projection includes using a centre punch having a tip diameter of approximately 0.5 mm.

17. The method according to claim 13, wherein the at least one projection is generated immediately before joining the structural elements.

18. A method for joining structural elements onto a shaft, comprising:
generating, by a centre punch having a tip diameter of approximately 0.5 mm, at least one projection at a respective joining position on the shaft;
heating at least one of the structural elements;
sliding the at least one of the structural elements over the at least one projection prior to cooling of the at least one of the structural elements; joining the at least one of the structural elements to the shaft; at the same time as joining the at least one of the structural elements to the shaft, generating at least one projection at one or more radial locations on an outer side of the shaft at another axial joining location along the shaft; and
shrink-fitting the at least one structural element on the at least one projection.

19. The method according to claim 18, wherein the structural elements are thermally joined with the shaft by at least one of heating the structural elements and cooling the shaft.

20. The method according to claim 18, wherein the at least one projection is generated immediately before joining the structural elements.

\* \* \* \* \*